United States Patent [19]

Pipes

[11] 3,809,259

[45] May 7, 1974

[54] HANDLE ENGAGING TOTE PAN RETRACTOR

[75] Inventor: George R. Pipes, Salt Lake City, Utah

[73] Assignee: Kenway Engineering, Incorporated, Bountiful, Utah

[22] Filed: Feb. 26, 1973

[21] Appl. No.: 336,109

[52] U.S. Cl. .............................. 214/164 A, 214/730
[51] Int. Cl. ................................................ B65g 1/06
[58] Field of Search .. 214/16.4 R, 16.4 A, 16.1 DB, 214/730

[56] References Cited
UNITED STATES PATENTS

| | | | |
|---|---|---|---|
| 2,386,520 | 10/1945 | Watson et al. | 214/16.4 A |
| 2,428,856 | 10/1947 | Sincki | 214/16.1 DB |
| 2,602,557 | 7/1952 | Sinclair | 214/16.1 DB |
| 2,707,666 | 5/1955 | Becker | 214/16.4 A X |
| 3,297,379 | 1/1967 | Artaud et al. | 214/16.4 A X |

*Primary Examiner*—Robert G. Sheridan
*Assistant Examiner*—R. B. Johnson
*Attorney, Agent, or Firm*—Lynn G. Foster

[57] ABSTRACT

An automated handle-engaging tote pan retractor and method for use with computer controlled warehousing stacker systems, the retractor comprising a support frame, an elevated platform which carries a retrieved tote pan from storage to a picking station, stop mechanisms which hold the retrieved tote pan on the retractor as it moves between storage and the picking station, and two tote pan handle-engaging mechanisms which pull a desired tote pan from a predetermined storage bin location on either side of a storage aisle onto the elevated platform and later push the retrieved tote pan in either direction onto a picking platform at a picking station.

4 Claims, 13 Drawing Figures

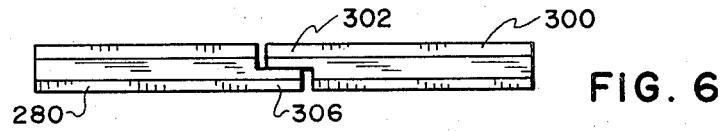
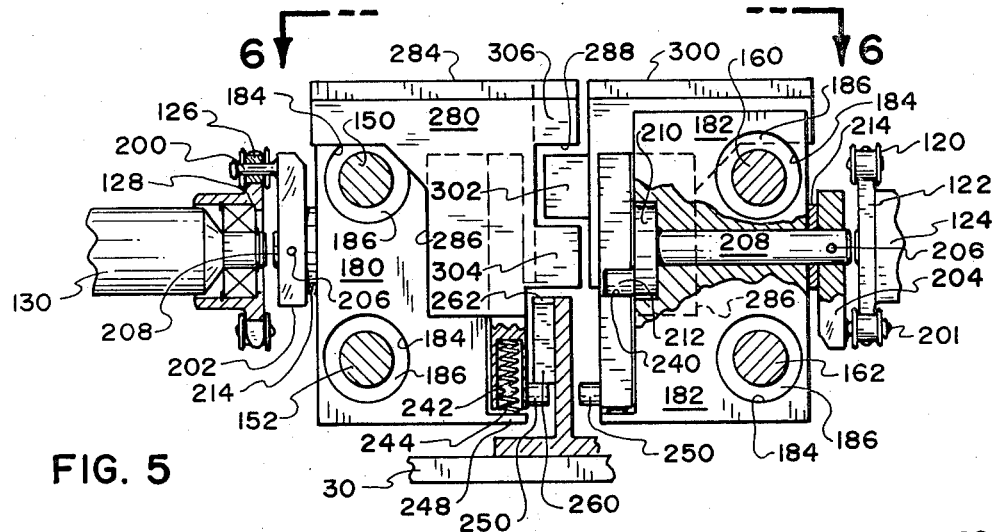
FIG. 6
FIG. 5
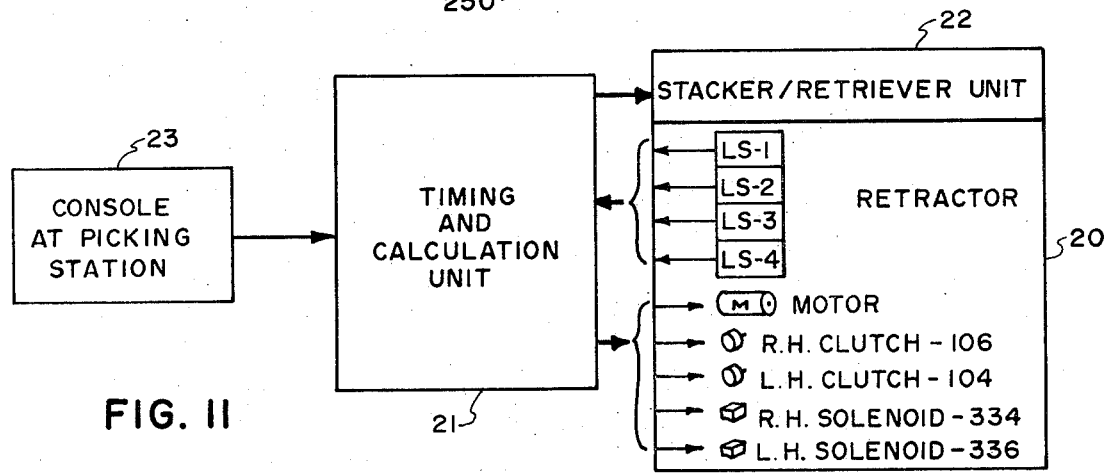
FIG. 11
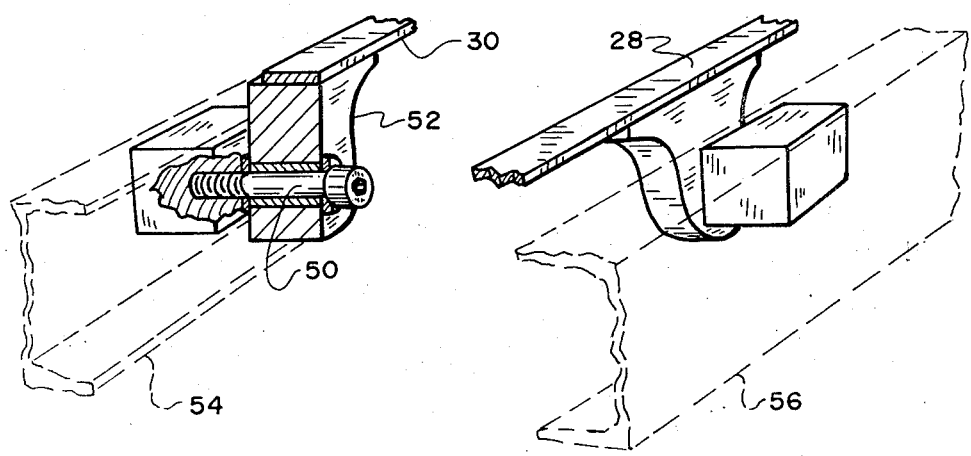
FIG. 12

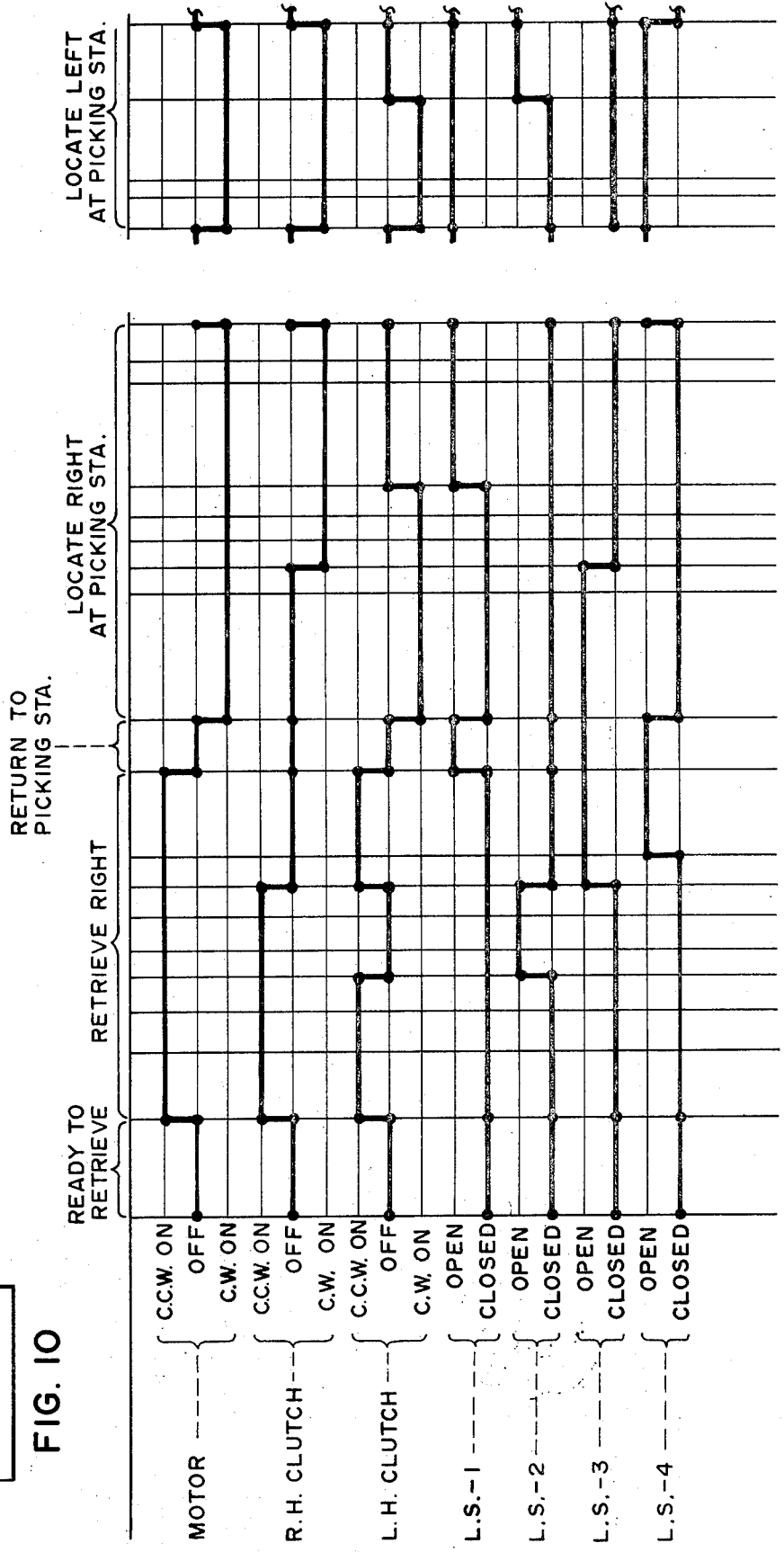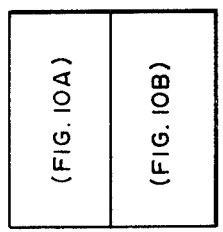

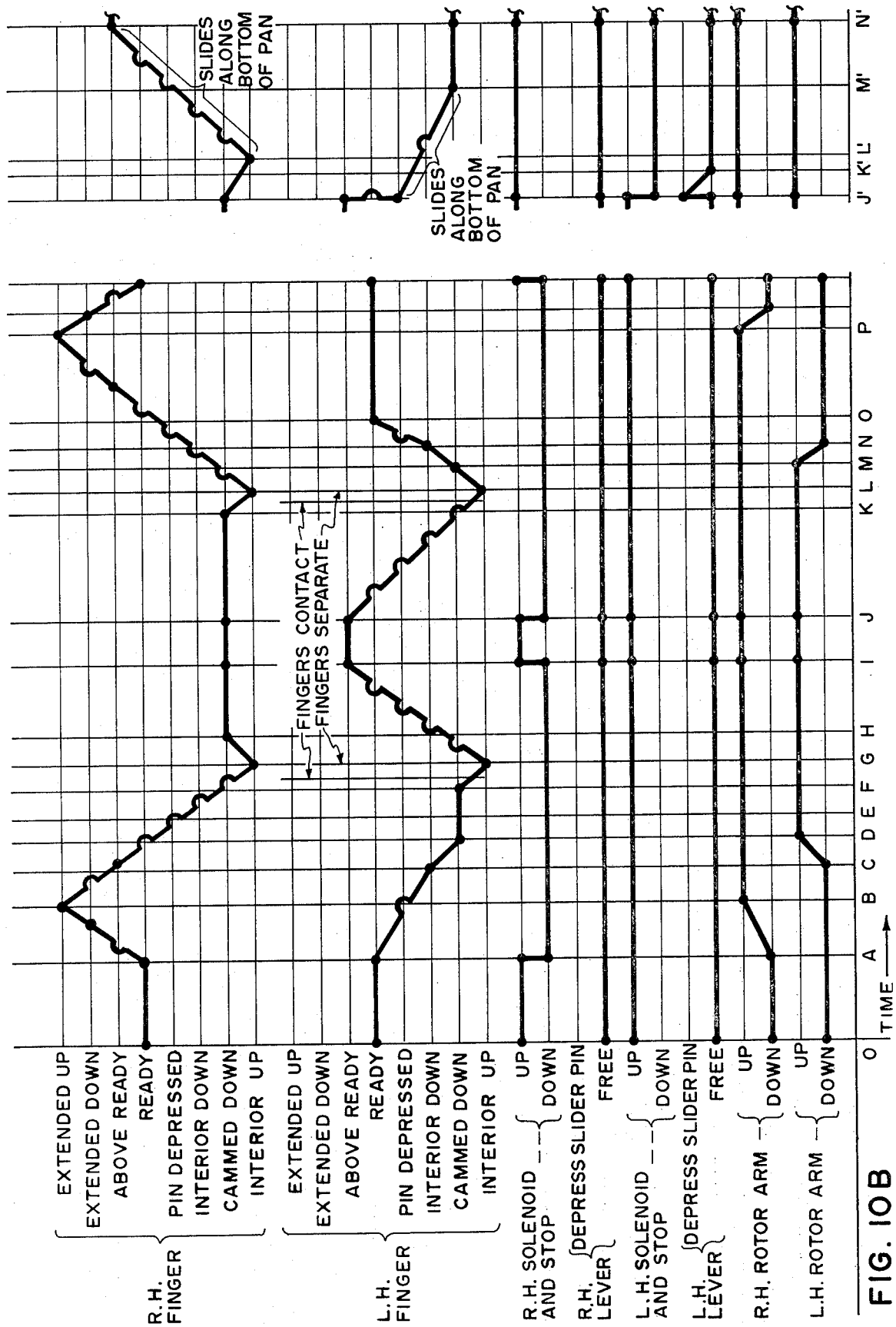

HANDLE ENGAGING TOTE PAN RETRACTOR

BACKGROUND

1. Field of Invention

The present invention relates generally to warehousing systems and more particularly to a novel handle-engaging tote pan retractor for automated stacking and retrieving from storage racks of tote pans containing stored merchandise where a retrieved tote pan is placed at a picking station where the operator may select items of merchandise needed.

2. Prior Art

Many three-dimensional automated merchandise retrieval warehousing systems have been proposed in the past, including stacker/retriever vehicles which move back and forth along and up and down within an aisle lined on each side with storage bins in which tote pans containing merchandise are stored. Various devices, known as tote pan retractors, have heretofore been proposed for use on such stacker/retriever vehicles to remove tote pans from storage bins and aid in placing such pans at a picking station.

Notwithstanding the foregoing, prior art tote pan retractors have been deficient in that (a) empty space in each bin has often been required to permit the retractor to enter the bin, latch onto and displace the pan from the bin, (b) they have been serviceable with only a single site picking station, (c) side displacement of the pan by the retractor at a picking site could not be in either direction at the election of the user independent of the side of the aisle from which the pan was obtained from storage, and (d) when disposed at the picking station remain in a horizontal attitude making picking of merchandise from the pan laborious.

BRIEF SUMMARY AND OBJECTS OF THE PRESENT INVENTION

The present invention comprises a handle-engaging tote pan retractor and method, to be used as part of an automated stacker/retriever system, whereby a tote pan in a storage bin on either side (right or left) of an aisle can be removed, delivered to a picking station, placed center, right or left at the picking station, and later returned in the same, though reverse manner to the desired storage bin location. No bin space is reserved for the retractor, and the retractor orients each pan at an angle in respect to the horizontal when situated at the multi-site picking station.

Accordingly, it is a primary object of the present invention to provide an improved tote pan retractor and method.

It is another important object of the present invention to provide a novel handle-engaging tote pan retractor and method whereby a tote pan in a storage bin on either side of an aisle can be removed, delivered to a picking station, placed center, right or left at the picking station and later returned in the same manner to the desired storage bin location.

It is a further object of the present invention to provide a novel tote pan retractor which operates such that bin space does not have to be reserved to permit the retractor to remove tote pans therefrom.

It is a further and significant object of the present invention to provide an improved tote pan retractor which improves the ease of picking by orienting each tote pan at an angle to the horizontal when situated at a picking station.

It is another paramount object of the present invention to provide an improved tote pan retractor and method servicing any desired location of a multi-site picking station.

It is another important object of the present invention to provide an improved tote pan.

These and other objects and features of the present invention will be apparent from the following detailed description, taken with reference to the accompanying drawings.

BRIEF DESCRIPTION OF DRAWINGS

FIG. 5 is a fragmentary elevation, partly in cross-section, of right hand and left hand tote pan handle-engaging fingers and the structure to which they are mounted and the structure which displaces each;

FIG. 6 is a partial top plan view taken along lines 6—6 of FIG. 5;

FIG. 10 is a motion diagram illustrating sequentially the events which occur in retrieving with the retractor a tote pan from a storage bin on one side of an aisle, bringing the pan to a picking station and thereafter placing it on the same or the opposite side of the platform of the picking station;

FIG. 11 is a schematic block diagram of the computer control; and

FIG. 12 is a fragmentary enlarged perspective representation of the manner in which the frame of the retractor is pivotally mounted for tilting to the stacker/retriever vehicle.

DETAILED DESCRIPTION OF THE ILLUSTRATED EMBODIMENT

Structural Arrangement

Figure 1:
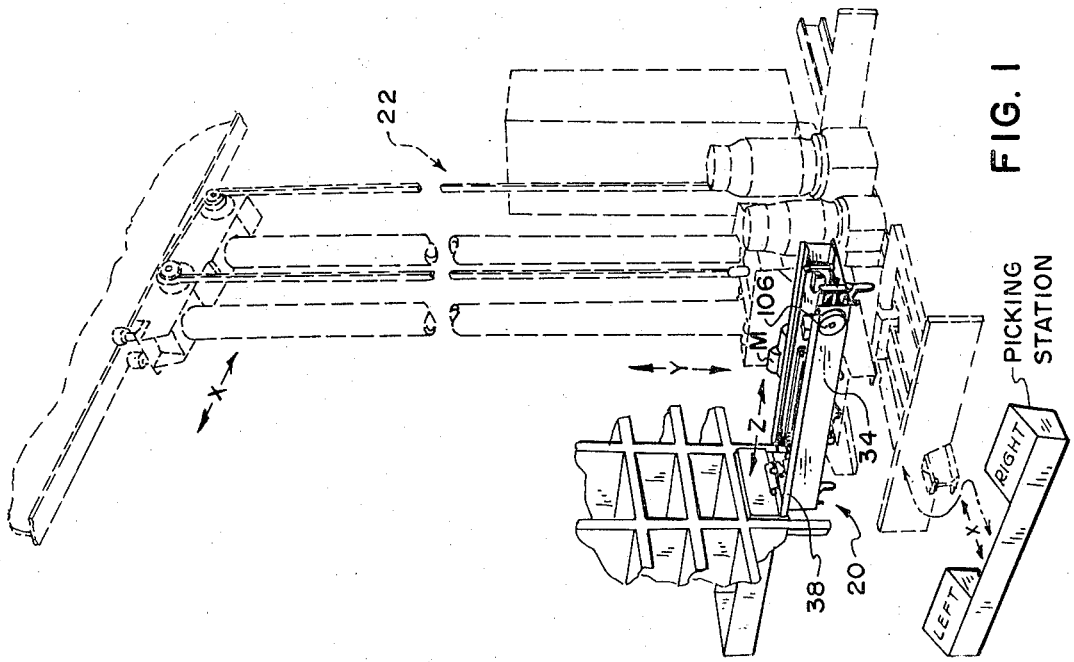
FIG. 1 is a perspective representation of the presently preferred embodiment of the present invention shown in mounted relation to a stacker/retriever of the prior art.
Figure 4:
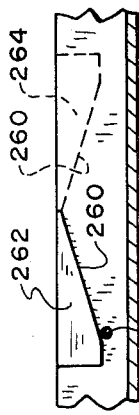
FIG. 4 is a fragmentary cross-sectional view taken along lines 4—4 of FIG. 3.

With specific reference to the Figures wherein the same numerals are used throughout to identify like parts, the present invention comprises a handle-engaging tote pan retractor 20 used in automated warehousing systems frequently known as computer controlled stackers. In respect to FIG. 1, the present retractor 20 is used to retrieve a tote pan to the left or to the right from a given bin location in a storage rack, one of which is situated on each side of an aisle. Any suitable device may be used to locate the retractor 20 in the appropriate X and Y locations for a given bin address, X being in a direction along the center line of aisle and Y in a vertical direction. The stacker/retriever 22 illustrated generally in FIG. 1 and more particularly described in U.S. Pat. No. 3,708,077, issued Jan. 2, 1973, is only one way of situating the retractor 20 at an appropriate X/Y bin address and displacing a tote pan on the stacker/retriever to a PICKING STATION (FIG. 1). Since stacker/retrievers and the like for the mentioned purpose are well known in the art, no additional description is believed to be necessary in this specification.

FIG. 11 illustrates in block diagram form the manner in which operation of a suitable stacker/retriever and the present retractor may be operated by a timing and calculation unit 21 under control of a console 23. The timing and calculation unit 21 may comprise a computing system such as a large scale computer which may be time shared or a mini-computer dedicated particularly to operation with the stacker/retriever 22 and the retractor 20. Such apparatus for providing calculation and timing functions is state of the art and not germane to the present invention. Instead, the present invention is directed to the retractor 20 and the manner in which the same is operated.

Figure 2:
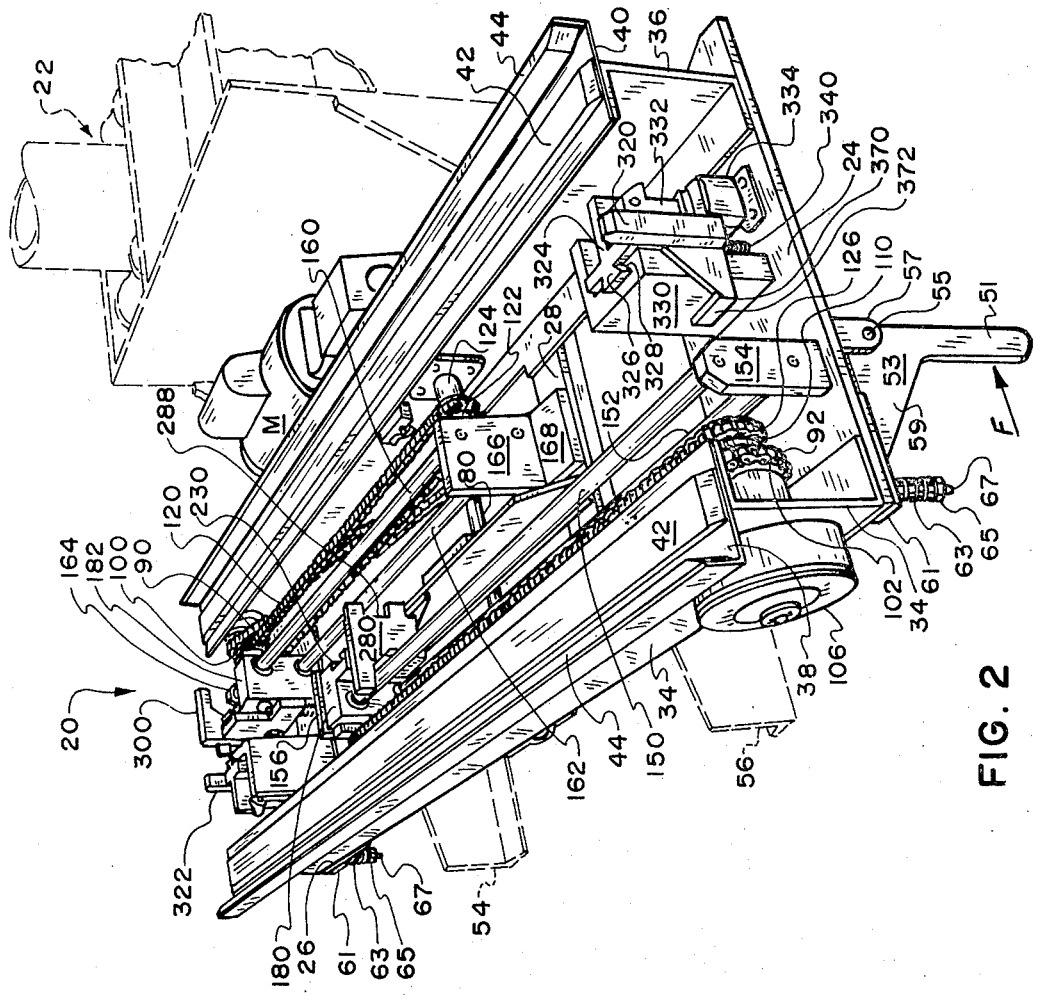
FIG. 2 is an enlarged perspective representation of the handle-engaging tote pan retractor of FIG. 1.
Figure 3:
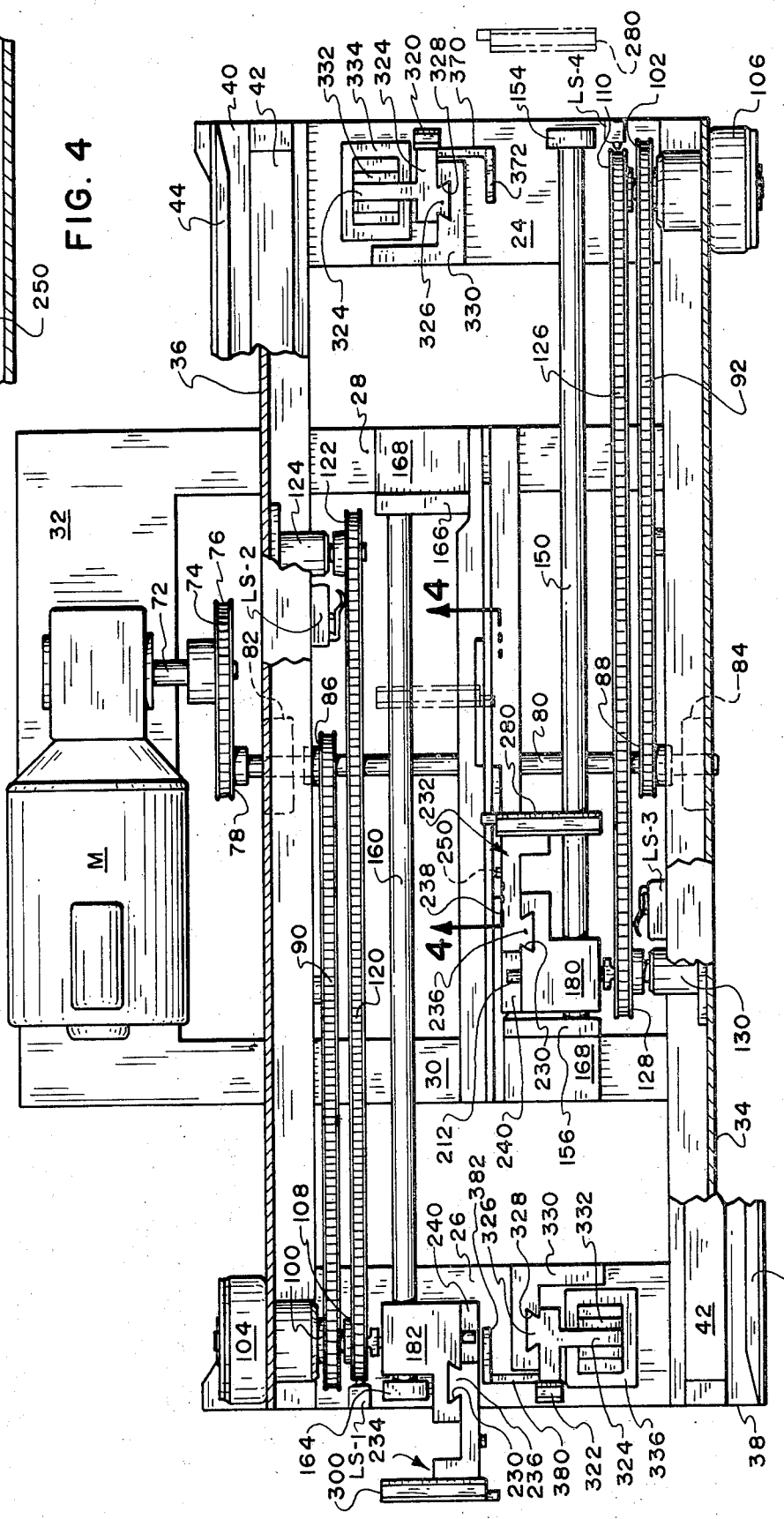
FIG. 3 is a plan view of the retractor of FIG. 3.

With particular reference to FIGS. 2 and 3, the retractor 20 comprises a metal frame comprising right hand and left hand tie plates 24 and 26, respectively, which run transverse of the main length of the retractor (Z axis). Also, between the two tie plates are disposed right hand and left hand motor support crossbars 28 and 30, which also extend transverse of the length of the retractor. The crossbars extend to the rear a greater distance than the tie plates and are spanned by a motor mount plate 32.

The tie plates 24, 26 and crossbars 28, 30 connect to a pair of upright front and rear channel shaped side rails 34 and 36 to form a rigid frame. It is presently preferred that the indicated connections be by suitable cap screws or bolts, although welding would be a suitable alternative. Welding or concealed countersunk bolts join front and back angle members 38 and 40 to the top flange of the front and back side rails 34 and 36, respectively. This fastened condition is best illustrated in FIG. 2. The long leg of each angle member 38 and 40 is disposed in an inwardly directed horizontal orientation while the short leg of each is directed upward. Each horizontal leg supports a nylon tote pan bottom slide 42, which may be secured in its position by countersunk screws or bolts, and the inside of each vertical leg of the angle members 38 and 40 is faced with a nylon tote pan side guide 44 which is likewise secured in position. The slides 42 and guides 44 are bevelled at each end.

The described rigid metal frame may be readily mounted upon the stacker/retriever 22 or any like mechanism. It is preferred that the mounting be pivotal at a location generally below the front side rail 34 near the center thereof. This arrangement is best illustrated in FIG. 12 where pivot pins 50 secured to the stacker/retriever 22 are pivotally joined in bearing housings 52 to permit tilting of the frame in the manner and for a purpose hereinafter to be more fully described. Otherwise the rigid frame, as described, rests upon frame members 54 and 56 comprising part of the stacker/retriever 22. Of course, the rigid frame may be mounted in any one of several suitable ways to any type of appropriate vehicle for traversing the X and Y axis as indicated in FIG. 1.

Figure 7:
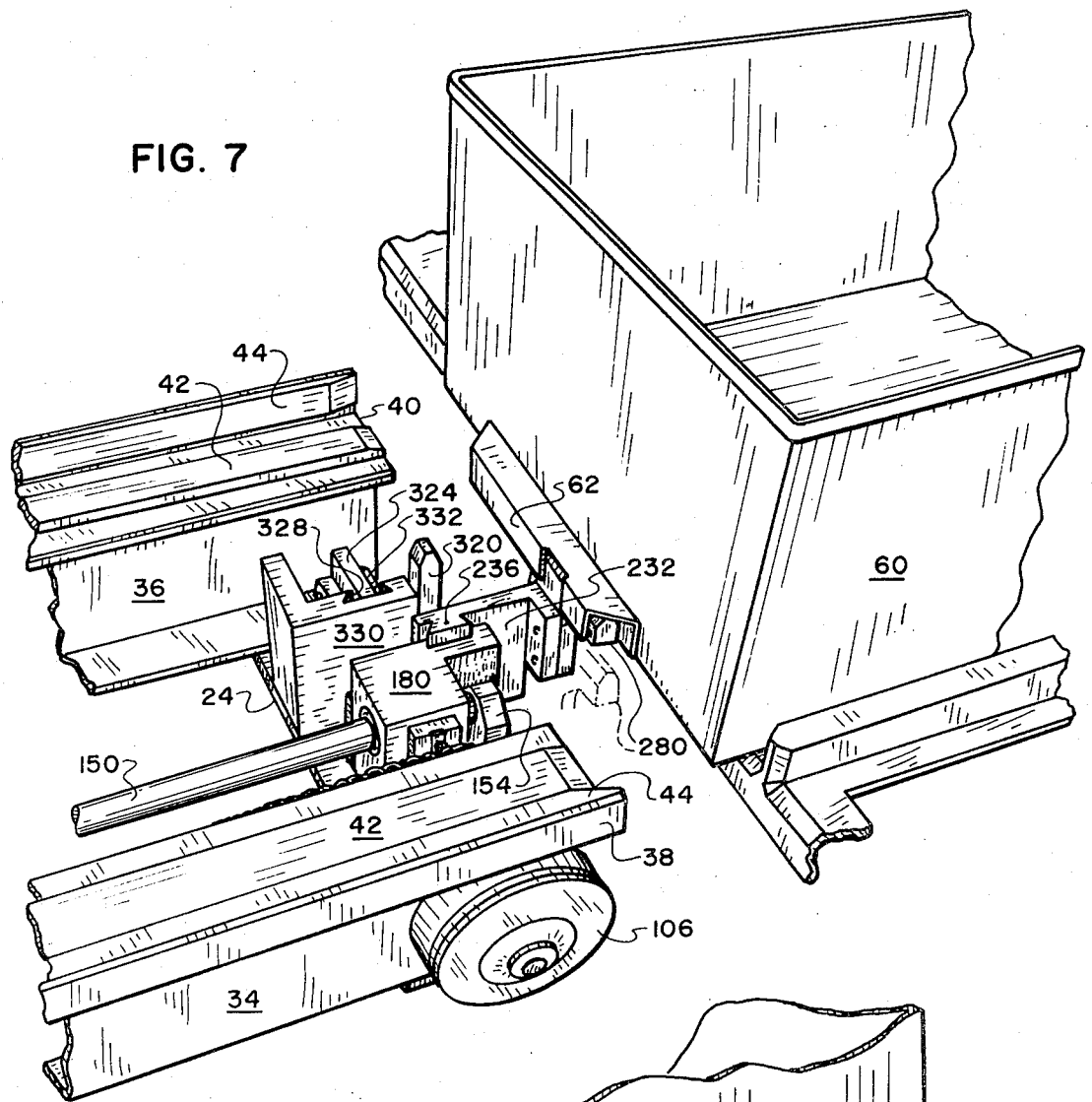
FIG. 7 is a fragmentary enlarged perspective representation of the right hand portion of the retractor of FIG. 1 with its right hand finger engaging the handle of a tote pan for retracting the tote pan from bin storage.
Figure 8:
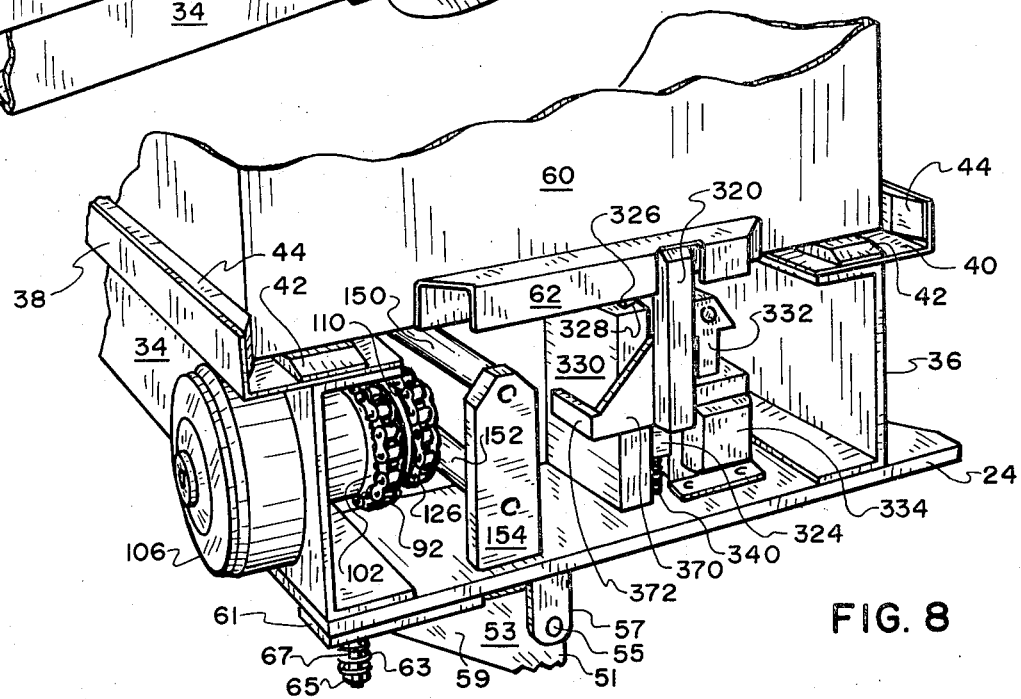
FIG. 8 is a fragmentary enlarged perspective representation of the right side of the retractor of FIG. 1 with the tote pan centrally located on an elevated platform of the retractor.
Figure 9:
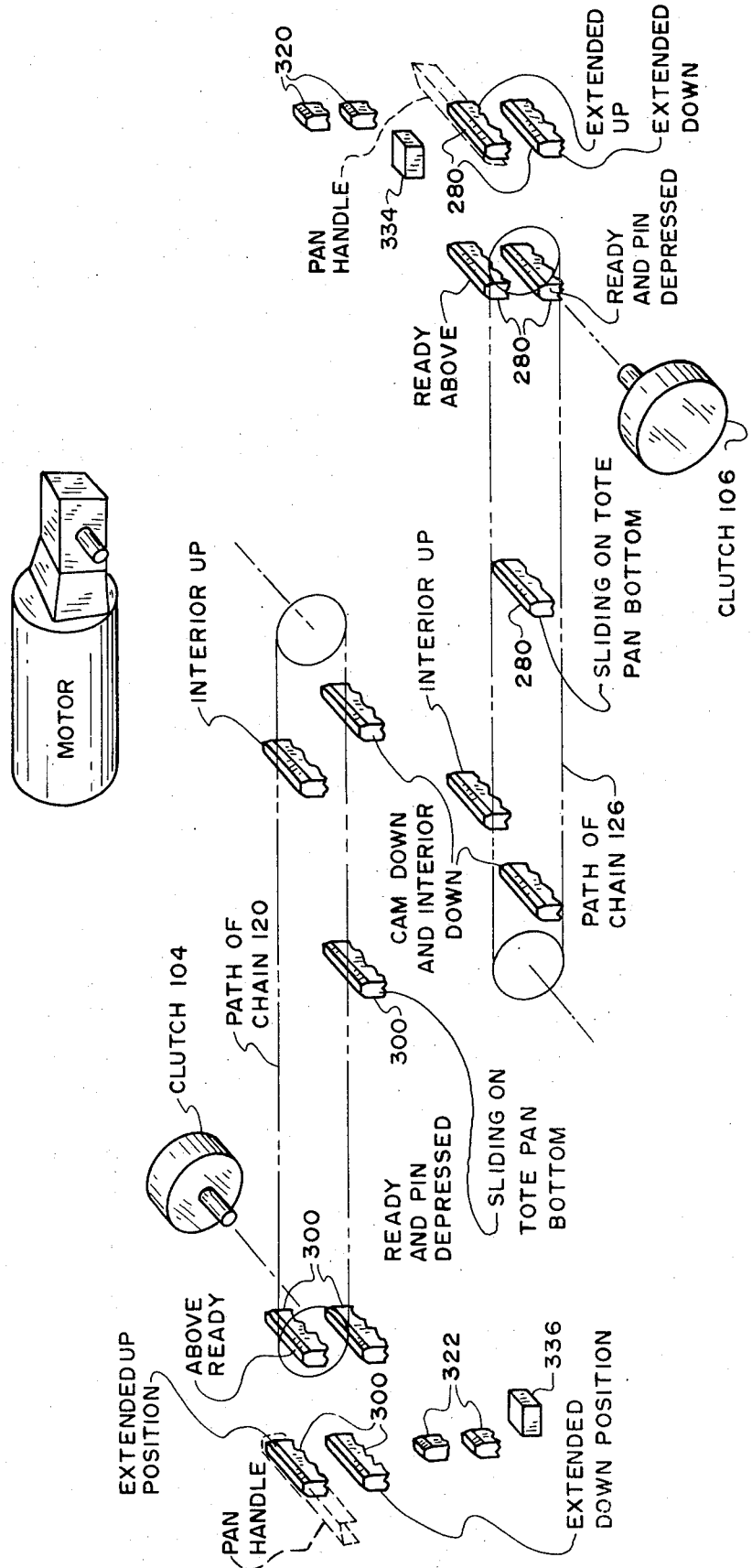
FIG. 9 is a three-dimensional schematic illustrating the various positions assumed at different points in time during the operation of the retractor by the left and right fingers which engage the handles of the tote pan.

The tote pans under consideration comprise, as illustrated in FIGS. 1 and 7, open top receptacles 60 having right and left U-shaped handles 62 disposed in welded relation with the right and left side walls, respectively, immediately above the bottom edge. Such tote pans typically contain warehouse items weighing on the order of 200–600 pounds making automated retrieval requisite, as opposed to manual retrieval. The present handle-engaging tote pan retractor 20 is adapted to retrieve a desired tote pan from an identified bin location (left or right) within the stacks and locate the pan centrally upon the retractor 20, following which the X/Y vehicle 22 returns the retractor and tote pan to a PICKING STATION at the forward end of the X axis. Thereafter, the retractor frame is tilted in a center position and either displaced left by the retractor 20 completely off the retractor onto an angular platform or displaced right by the retractor 20 completely off the retractor onto a second angular platform. In this way, using a computer controlled state of the art stacker system, the present invention permits as many as three individuals to retrieve the inventory desired from up to 3 separate tote pans located center, left and right at the PICKING STATION, as opposed to the one-man, one pan capability of many prior art systems. Moreover, some prior art systems have been restricted to retrieving from bins on one side of an aisle and placing the retrieved tote pan to the same side at a PICKING STATION. The present invention has capability of placing a retrieved tote pan right or left independent of the bin direction from which it was obtained.

The structure by which the retractor removes tote pans from a given bin location and by which such a retrieved tote pan is placed left or right at the PICKING (P) station will now be described in detail. All mechanisms which are moved from place to place are powered by a reversible gear motor M which is suitably mounted to the motor mount plates 32. While any suitable gear motor may be used, it is presently preferred the model No. F313B-20-J1-ER, manufactured by Boston Gear Co. be used. The drive shaft 70 of the motor turns a sprocket 74 which in turn rotates a short drive chain 76. The drive chain 76 in turn rotates a sprocket 78 which is non-rotatably joined to a jack shaft 80 spanning between the side rails 34 and 36. A pillow block 82 and 84 at each end rotatably supports the jack shaft 80 in mounted relation to the lower flange of the side rails 34 and 36. Two additional sprockets 86 and 88 are non-rotatably mounted to the jack shaft 80 and are rotated by the shaft 80 in a direction responsive to the direction of rotation of shaft 72, shaft 72 being capable of rotating in either direction depending upon the direction of rotation of motor M. The "off," "on-clockwise" and "on-counterclockwise" conditions of motor M are controlled by timing and calculation unit or central processing unit 21 in a manner well known in the art. The sprockets 86 and 88, respectively, engage drive chains 90 and 92, which are endless and engage, respectively, clutch sprockets 100 and 102. Each sprocket 100 and 102 respectively comprises an idler when the associated clutch, left hand clutch 104 and right hand clutch 106 is deenergized.

Electric clutches 104 and 106 may be of any suitable type, although it is presently preferred that model No. 304 Dynamatic produced by Eaton Corporation be used. Once energized, by a signal from the central processing unit 21, the clutches 104 and 106, respectively, drive adjacent sprockets 108 and 110, which are respectively mounted to a central drive shaft forming part of the associated clutch. Consequently, when the clutch 104 is energized and the motor M is rotating in one direction or the other, the sprocket 108 rotates and drives endless chain 120 in the same direction.

The drive chain 120 is supported in taut relation by an idler sprocket 122 which is rotatably carried by an idler mounting bracket 124 suitably rigidly secured to the vertical web of the side rail 36. Likewise, when clutch 106 is energized and motor M rotating in one direction or the other, sprocket 110 drives endless chain 126 around idler sprocket 128 in the same direction, sprocket 128 being rotatably carried by idler mounting bracket 130. Bracket 130 is in turn welded or otherwise suitably rigidly secured to the vertical web of the front side rail 34.

It should be appreciated that, while not shown, any of the endless chains 76, 90, 92, 120 and 126 may be provided with suitable chain take-up mechanisms, well known in the art, to maintain the chains in essentially taut condition.

A pair of vertically spaced, horizontally directed right hand guide rods 150 and 152 are supported in the illustrated position by exterior guide rod support bracket 154 and interior guide rod support bracket 156. In each case, both rods 150 and 152 are situated in stepped bores of the brackets 154 and 156 and retained in that position by screws extending through the narrow part of the bore from the back side of the bracket and threadedly secured to a threaded blind bore within the end of each guide rod.

Vertically spaced horizontal left hand guide rods 160 and 162 are in like manner held rigidly in the position best illustrated in FIG. 2 by end and interior guide rod support brackets 164 and 166. Each exterior guide rod support brackets 154 and 164 are respectively welded to the right hand and left hand tie plates 24 and 26 while the interior guide rod support brackets 156 and 166 are integral with a base plate 168 which in turn is welded to the right hand and left hand motor support crossbars 28 and 30, respectively.

A retractor dovetail slide block 180 and 182 is slidably mounted upon the right hand and left hand guide rods 150, 152 and 160, 162, respectively. As shown in FIG. 5, each rod extends through a bore 184 which has a press fit bushing 186 interposed between the bore 184 and the adjacent rod. Thus, the blocks 180 and 182 slide freely along the spaced rods in either direction. Each retractor dovetail slide block 180 and 182 is anchored to one link 200 and 201 of the adjacent chain 126 and 120, respectively, by right hand and left hand rotor arms 202 and 204. Rotor arms 202 and 204 follow the link 200 and 201 of the chain to which they are attached around the sprockets 110 and 108, respectively, thereby moving from an up to a down position or vice versa at said sprocket. The same motion is caused to occur at sprockets 128 and 122, respectively. Otherwise, the arms 202 and 204 maintain an established up or down disposition and are linearly displaced by the chain drives 126 and 120 between said rotating sprockets. Each arm 202 and 204 is non-rotatably mounted by a roll pin 206 (FIG. 5) to a transverse shaft 208 which inwardly terminates in an enlarged puller cam 210 to which the shaft 208 is rigidly attached. A cam pin 212 is eccentrically disposed on each cam 210 which projects beyond each slide block 180 and 182 a short distance for a purpose later to be described. It should be appreciated that each shaft 208 is rotatably disposed within its associated slide block 180 and 182. A spacer 214 maintains the rotor arm 202 and 204 away from its associated block 180 and 182.

With the foregoing in mind, it should be appreciated that slide block 180 travels back and forth as chain 126 travels back and forth. In like manner, block 182 travels back and forth as chain 120 travels back and forth. When arm 202 or 204 is down, the associated cam pin 212 is down as shown on the right in FIG. 5; when the rotor arm 202 or 204 is up, the associated cam pin 212 is likewise rotated to an elevated position.

Each slide block 180 and 182 carries at a dovetail slot 230 a dovetail slider 232 and 234, respectively. Each slider 232 and 234 comprises a dovetail extension 236 which mates with the vertically extending dovetail slot 230 of the associated slide block 180 and 182. This union is such as to permit each dovetail slider to move vertically up and down in a manner hereinafter explained. Each dovetail slider 232 and 234, as best seen in FIG. 3, is L-shaped such that the male dovetail extension 236 is located on the inside of the long leg 238, the long leg 238 terminating in an open top notch defining stepped horizontal surface 240. Immediately below the surface 240 is a blind core 242 (FIG. 5) which opens at the bottom and receives a compression spring 244 such that the spring abuts the end 246 of the bore as well as a platform 248 of the associated slide block 180 or 182 and urges the block 232, 234 up. Thus, when the associated dovetail vertical slider 232 or 234 is otherwise unconstrained, the compression spring 244 will elevate the slider so that it projects vertically above its associated slider block 180, 182. The dovetail sliders 232 and 234 are constrained in a vertically depressed condition in one of three fashions, i.e., (a) when the associated rotor arm 202 or 204 is in the down position causing the related cam pin 212 to engage the slider surface 240 and press the slider down into the position illustrated on the right in FIG. 5, (b) when the forward pin 250, which projects inwardly from the interior surface of the long leg 238 of each dovetail slider 232 and 234, is held down by contact with cam surface 260 of a cam plate 262 or 264, respectively, and (c) when a reset lever, hereinafter described, is caused to engage and depress pin 250 at a specific time and location, to be later explained in detail.

The cam plates 262 and 264 are mounted on the front and back surfaces of an inverted T-shaped cam support rail which is centrally located and runs lengthwise between the crossbars 28 and 30 such that the stem of the T faces upward. The base of the T is suitably anchored as by welding or bolting to the crossbars 28 and 30.

A right hand tote pan handle-engaging finger 280 is rigidly connected to the short leg 282 of the dovetail slider 232, preferably using countersunk screws so that the top edge of the right hand retractor finger 280 is always a specific distance above the top surface of the slider 232. The slider 280 is configured to provide a downwardly opening edge notch 286 (FIG. 5), which allows the finger 280 to clear the exterior guide rod support bracket 154, and with a U-shaped recess 288 and top and bottom rearwardly directed projections 304 and 306, for reasons to be explained. It is to be appreciated that finger 280 moves vertically up and down as does its associated slider 232.

In the same manner as above described, left hand retractor finger 300 is linked to the short leg 282 of the dovetail slider 234. The same downwardly extending open corner groove 286 allows left hand finger 300 to clear its outside support bracket 164. Finger 300 provides an extension 302 which comfortably passes through slot 288 of finger 280 when the two are aligned at the same elevation but will engage projection 304 of the finger 280 (when finger 280 is up and finger 300 down) or projection 306 (when finger 280 is down and finger 300 up). This engagement occurs from time to time in the center of the retractor in a manner and for a purpose hereinafter to be explained.

It is to be appreciated that each finger 280 and 300 is capable of being positioned in any one of nine positions during use, i.e., (1) READY, (2) EXTENDED DOWN, (3) EXTENDED UP, (4) ABOVE READY, (5) PIN DEPRESSED, (6) INTERIOR UP, (7) CAMMED DOWN, (8) INTERIOR DOWN and (9) CONTACT/TOTE BOTTOM. Each of these positions will later be defined in detail. These positions are significant in the operation of the device.

Right hand and left hand stop fingers 320 and 322 may be placed in up or down positions to constrain a tote pan on the retractor or permit its passage onto or off from the retractor platform, respectively. Each stop finger 320 and 322 is secured by countersunk screws or the like to a dovetail slider 324. The dovetail slider 324 comprises a dovetail extension 326 which accommodates up and down relative movement in a dovetail slot 328 of a stop dovetail block 330 which extends in a vertical direction and is anchored at its base by a suitable weldment or the like to the associated tie plate 24, 26. The dovetail slider 324 is connected to the armature 332 of the associated solenoid 334, 336, the solenoid being anchored to the adjacent tie plate 24, 26. Thus, when the solenoid 334, 336 is deenergized, the stop finger 320, 322 is elevated under bias of a base spring 340 interposed between the slider 324 and the associated tie plate 24, 26. When the solenoid 334, 336 is energized, the armature 332 retracts downward, pulling the slider 324 and the stop finger 320, 322 down.

The previously described pin connection between the retractor and the X/Y vehicle accommodates tilting as mentioned such that when it is desired to tilt the retractor with a tote pan thereon, a force F is caused to be applied to the downwardly extending lever 51 of a bell crank 53. The bell crank is pivotally joined to the tie plate 24 by a pin 55 situated through a clevis 57 and the central portion of the bell crank 53. The horizontal lever 59 of the bell crank comprises a horizontal abutment plate 61 which is abutted by a spring 63 held under compression by a nut 65 threadedly secured on the lower end of a threaded springbar 67. Thus, force F is resisted by the spring, permitting the indicated tilting with the pins properly located for balance beneath the rigid frame of the retractor. In a tilted position, a tote pan is more readily accessible to the user at the P STATION and can be displaced left or right in the tilted condition onto a correspondingly inclined platform of the P STATION.

The right hand stop finger 320 and associated dovetail slider 324 are integrally joined to a right hand L-shaped reset lever 370, such that the free leg 372 of the reset lever 370 is held out toward and oriented parallel to the drive chain 126 and the guide rods 150 and 152.

In like manner, left hand L-shaped reset lever 380 is joined to finger 300 and its dovetail slider 324 such that the free leg 382 of the reset lever 380 is held toward and oriented parallel to the drive chain 120 and the guide rods 160 and 162. The purpose of the two reset levers 370 and 380 is to allow, through solenoid displacement in a downward direction, establishment of the PIN DEPRESSED finger condition which results in removal of the right hand or left hand finger 280 and 300 from engagement from a tote pan handle when the pan is situated on the retractor 20 between the stop fingers 280 and 300. Thus, for example, when right hand solenoid 334 is signaled by the central processing unit 21 (with the right hand finger 280 in the right hand handle 62 of a tote pan 60 in the ABOVE READY condition) the free leg 372 is caused to lower and engage the pin 250 of the slider 232 depressing the slider 232 and the right hand finger 280 out of the right handle of the tote pan leaving the associated rotor arm in an elevated position. Thereafter, upon proper signal the chain 126 is rotated counterclockwise bringing the finger 280 back to the central or interior CAMMED DOWN position. At the same interval of time during which finger 280 is removed from the right handle of the tote pan and placed in its central CAMMED DOWN position, the left hand finger 300 is moved by chain 120 from its CAMMED DOWN (rotor up) position in a leftward direction such that, once the finger clears the cam 264, it continues to run along the bottom of the tote pan 60 with the spring thereof exerting an upward pressure. Thus, when the finger 300 clears the pan, it will immediately move in an upward direction and engage the left handle 62 of the tote pan. As can be seen particularly by examining FIG. 3, four limit switches LS1-LS4 are situated at various locations on the retractor frame. Typically, these limit switches, which input to the central processing unit 21, have actuators which project into a position near the adjacent chain drive. Thus, by using a special chain link which interfers with the location of the switch actuator as the chain link passes that location, the limit switch will be tripped at precisely the right time as required by the motion diagram of FIG. 10.

As mentioned earlier each tote pan handle-engaging finger 280 and 300 is capable of being situated in any one of nine positions. These positions may be defined as follows:

READY — the finger is directly above the edge of the retractor, with the rotor arm down.

EXTENDED DOWN — the finger has been advanced beyond the edge of the retractor, with the rotor arm down as it is about to rotate upward around the sprocket 100, 110.

EXTENDED UP — the finger is immediately above its EXTENDED DOWN position, the rotor arm having rotated around the end sprocket 100, 110 and the finger having engaged the tote pan handle, when it is in that location.

ABOVE READY — the finger is elevated into one handle of the tote pan and is located immediately above the READY position at the edge of the retractor with the rotor arm up.

PIN DEPRESSED — the reset lever arm 372, 383 is down responsive to the associated solenoid being energized and the finger is likewise down by reason of engagement of the reset lever arm with the finger pin 250. One tote pan handle is immediately above the depressed finger and the rotor arm is up.

INTERIOR UP — the finger is essentially above the jack shaft 80 between the two cam plates 262 and 264 with the finger up and the rotor arm up.

CAMMED DOWN — the finger is down by reason of contact between the adjacent cam surface and the finger pin 250 and the rotor arm is up.

INTERIOR DOWN — the finger and rotor arm are down and the finger is located near the midpoint of the retractor.

CONTACT/TOTE BOTTOM — the rotor arm is up and the finger is biased toward its up position but is unable to achieve that position because of contact with the bottom of the tote pan.

Specific reference is now made to FIGS. 10 and 11 which respectively illustrate in three-dimensional schematic the various positions assumed at various points in time by the right hand retractor finger 280 and the left hand retractor finger 300 (FIG. 10), and a motion diagram illustrating the time sequence of events required to retrieve a tote pan from a specific bin on the right and place it later on the right at the P STATION or, alternatively, on the left at the P STATION (FIG. 11). Since retrieve right at a given bin address requires the same though opposite hand steps as retrieve left, only one retrieval process need be here described.

Initially, at time A, the operator or user using the console 23 will signal a central processing unit 21 to retrieve right using the retractor 20 at a given bin location. The vehicle 22 will traverse the X and Y axis to the extent necessary to locate the retractor 20 immediately adjacent and below the bin in question. A control signal from the central processing unit 21 turns the motor M, the right hand clutch 106 and the left hand clutch 104 "on," such that each rotates counterclockwise as viewed when facing retractor 20 and motor M. As can be seen from FIG. 11, the right hand finger 280 and the left hand finger 300 are in their READY positions upon actuation of clutches 106 and 104. The right hand stop finger 320 is moved from its up to its down position at time A when the solenoid 334 is energized by the command signal mentioned above. The counterclockwise on condition of the motor M and the clutches 106 and 104 displaces the right hand finger 280 from its READY condition through the EXTENDED DOWN position to the EXTENDED UP position where the right hand finger 280 engages the left tote pan handle 62. This occurs at time B. During the time interval A-B, the left hand finger 300 is being displaced by chain 120 from its READY position through its INTERIOR DOWN position, at time C, to its CAMMED DOWN position, with the associated rotor arm up. This is accomplished at time D. At time D, the displacement of left hand finger 300 turns limits switch LS2 "off" thereby causing deenergization of left hand clutch 104, left hand rotor arm moving from its down to its up condition between times C and D.

Once the right hand finger 280 has engaged the left tote pan handle 62 in its EXTENDED UP position, at time B, continued energization of right hand clutch 106 and rotation in a counterclockwise direction of the clutch 106 and the motor M will displace the right hand finger 280 and the tote pan in a leftward direction pulling the pan 60 by its handle 62 out of its bin location and onto the retractor along the two tote pan bottom slides 42 between the two tote pan side guides 44.

At time E, the extension 304 of the right hand finger 280 contacts the extension 302 of the left hand finger 300. Thus, finger 280, for a short distance, pushes finger 300 from right to left. In so doing, the pin 250 of the left hand slider block 234 moves progressively up the cam surface 260 of the rear cam plate 264. This causes extension 302 of finger 300 to elevate in respect to extension 304 of finger 280.

When the pin 250 of the slider 234 clears the rear cam plate, the left hand finger 300 elevates into the left handle 62 of the tote pan 60. This occurs at time G at which time limit switch LS2 is closed causing left hand clutch 104 to once more rotate in a counterclockwise direction responsive to counterclockwise rotation of motor M. A very short interval of time thereafter, at time H, the right hand finger 280 is placed in its CAMMED DOWN position by engagement of pin 250 with the cam surface 260 of the front cam 262 and limit switch LS4 is open causing the right hand clutch 106 to turn off, leaving the right hand finger 280 in its CAMMED DOWN position for the remainder of the retrieve right operation.

Meanwhile, the left finger 300 continues to pull pan 60 by left handle 62 from right to left across the tote pan bottom slides 42 responsive to counterclockwise rotation of the left hand clutch 104 driven by counterclockwise rotation of motor M. Thereafter, at time I, the left hand finger 300 reaches its ABOVE READY position, limit switch LS1 is turned off causing the central processing unit 21 to turn the left hand clutch 104 and motor M off and deenergize the right hand solenoid 334 causing the stop finger 320 to elevate. The left hand stop finger 322 has remained in an elevated position throughout the entire retrieve right operation, since at no time was the left hand solenoid 336 energized. At this point in time, the tote pan 60 is situated entirely upon the retractor 20 between the stop fingers 320 and 322. In this condition, during time interval I-J, the X/Y vehicle 22 returns with the retractor 20 and the tote pan 62, to the PICKING (P) STATION.

At time J, the X/Y vehicle 22 and the Z retractor 20 with tote pan 60 aboard have reached the PICKING STATION and the retractor 20 has tilted forward. If it is desired to transversely shift the tote pan 60 right onto a suitable angular platform (see FIG. 1) the retractor 20 is operated as follows. The operator at the console 23 causes the unit 20 to issue a command signal, which turns the motor M "on" causing it to rotate in a clockwise direction and energizes clutch 104, causing it to rotate in a clockwise direction thereby rotating chain drives 120 and 126 clockwise. Switch LS4 is closed energizing the right hand solenoid 334 causing the right hand stop 320 to lower. Consequently, the right hand finger initially remains idle in its CAMMED DOWN position while the left hand finger moves from left to right pushing the tote pan as it moves. At time K, the extension 302 of left hand finger 300 contacts extension 306 of right hand finger 280 and the two are displaced together for a short distance under power transmitted by clutch 104. This causes the right hand slider 332 at pin 250 to move up the cam surface 260 of the front cam 262 until it reaches its INTERIOR Up condition.

At this time, the finger 306 having elevated in respect to finger 302 as the pin 250 moved up the cam surface 260 allows finger 302 to pass through groove 288 thereby separating the fingers 300 and 280. At this time, limit switch LS3 is closed causing clutch 106 to be energized and rotate in a clockwise direction. Since in the INTERIOR Up position the right hand finger 280 has engaged the handle 62 of the tote pan 60, clockwise rotation of the right hand clutch 106 causes right hand finger 280 to thereafter displace the tote pan across the tote pan bottom slides 42 onto the right PICKING platform.

As the right finger 280 is so pushing the tote pan 60, the left finger 300 continues to be driven in a clockwise direction by left hand clutch 104 such that it moves from its INTERIOR UP position (time L) along the back cam surface 260 to its CAMMED DOWN (time M) and then to its INTERIOR DOWN position (time N) and from there back to its READY position (time O). At time O, limit switch LS1 is turned off, which causes clutch 104 to be deenergized. Thus for the remainder of the locate picking right operation, the left hand finger 300 remains in its READY position.

At time P, the right hand finger 280 fully displaces the tote pan 60 onto the right PICKING platform, i.e. when the finger 280 is in the EXTENDED UP position. Continued displacement of the finger 280 moves it through its EXTENDED DOWN position to its READY position, at which time limit switch LS4 is opened, turning motor M off and deenergizing clutch 104 and solenoid 334, the latter causing the right hand stop finger 320 to elevate. At this point in time the retractor 20 is in a ready to retrieve condition.

To illustrate the capability of the present retractor to retrieve a tote pan from one direction along the Z axis from a suitable bin location and displace the same in the opposite direction at the PICKING STATION, let us assume that the above-described retrieve right operation has just been carried out and the retractor 20 with tote pan 60 has arrived at the central location of the PICKING STATION at time J'. The conditions graphically indicated at time J' in FIG. 10 would exist, being the conditions existing at the end of the retrieve right operation, i.e., at previously mentioned time I. A command from the central processing unit 21 turns the motor M "on" and rotates it in a clockwise direction while at the same time clutches 104 and 106 are energized so that they rotate clockwise. Instantaneously before the clutches are energized, the left hand solenoid 336 is energized pulling the left stop finger 322 down and causing the left hand reset lever 380 at arm 382 to depress pin 250. Thus, the left hand finger 300 is removed from the left handle 62 of the tote pan 60 and, as the clutch moves the left hand finger 300 toward the right by displacement of chain 120, pin 250 of the slider 234 slips from the arm 382 and comes into sliding engagement with the smooth bottom of the tote pan 60. This arm/pin separation occurs at time K'.

Beginning at time J', clockwise rotation of clutch 106 displaces the right finger 280 from its CAMMED DOWN position into what would be its INTERIOR UP position except the top edge of the finger 280, before achieving a fully erect position engages and is displaced along the smooth bottom of the tote pan 60. This occurs at time L'. The fingers 280 and 300 continue to slide along the bottom of the tote pan until the left hand finger 300 reaches its CAMMED DOWN position at time M' causing limit switch LS2 to open clutch 104 to deenergize.

Likewise, the right hand finger 280 continues to slide along the bottom of the tote pan 60 until it passes the right edge, at which time the spring bias imparted thereto causes the finger 280 to elevate and become disposed in the right handle of the tote pan 60. This condition exists at time N' and has placed the retractor 20 in the same position it would have been in had the retrieval been from the left rather than from the right. Thereafter, the tote pan is displaced onto the platform left at the PICKING STATION using the same procedure as described in the locate right at PICKING STATION procedure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tote pan retractor for an automated handling system to be carried by a vehicle traversing horizontally and vertically along an aisle aligned on each side with storage bins between a predetermined bin location and a picking site comprising:
   frame structure for eccentrically pivotally mounting the retractor to the vehicle such that the longitudinal axis of the retractor is transverse of said aisle, said frame carrying all other retractor components;
   an elevated tote pan receiving platform;
   a selectively operated reversible motor;
   a pair of selectively operated two way clutches, one being located toward the front and one toward the back of the frame structure;
   drive means connecting the output of the motor to the input of each clutch;
   an endless chain drive situated parallel to said longitudinal axis in a horizontal plane and spanning between the output of each clutch and an idler, one said chain drive extending from one end of the retractor to beyond the midpoint thereof and the other from the opposite end of the retractor also beyond the midpoint, each endless chain drive having upper and lower horizontal lengths of chain;
   first and second horizontal guide rod means disposed adjacent and parallel to each endless chain drive and extending over essentially the same distance;
   a guide block horizontally slidably mounted upon each guide rod means for back and forth horizontal motion;
   an eccentric rotor arm interposed between one site of the adjacent endless chain drive and a pivotal mount comprising part of the guide block, said pivotal mount comprising a cam, each rotor arm moving linearly between the associated clutch and idler and rotationally at the clutch and idler sites whereby between said sites the rotor arm is either up or down;

a tote pan engaging finger mounted to each guide block for relative vertical movement each finger being normally biased to an elevated position;

cam means connected to the associated pivotal mount and rotatable with the associated rotor arm to counter bias the associated finger downwardly when the related rotor arm is down;

whereby when the retractor is placed by the vehicle adjacent a desired bin location on either side of the aisle the finger juxtaposed thereto, with rotor arm down, is extended out and then lifted up as the cam counter bias is relieved during chain and rotor arm rotation to engage an end wall handle of the tote pan, following which the tote pan is pulled from the bin along the retractor platform to essentially the midpoint of the retractor while the top horizontal leg of the associated chain drive is traversed by the elevated rotor arm, following which the engaged finger is retracted down from the handle and the other finger is extended up into the handle with its associated rotor arm up and the tote pan is pulled by chain powered displacement of the second finger the remaining distance along the retractor platform.

2. The apparatus of claim 1 further comprising a solenoid-operated reset actuator situated above part of the handle-engaging finger with the tote pan on the retractor platform to depress the finger from the handle whereby said finger may be centrally positioned on the retractor and the other finger chain displaced to the opposite end of the retractor and lifted into the other handle whereby the tote pan may be pushed from the retractor platform at the picking site to the side opposite the bin retrieval side.

3. The apparatus of claim 1 further comprising cam means mounted to said frame structure and cam follower means mounted to the first-mentioned finger whereby the first-mentioned finger is retracted down from the handle when the tote pan has been pulled to essentially the midpoint of the retractor platform.

4. The apparatus of claim 1 further comprising at least one spring biased bell crank pivotally mounted beneath the frame structure and comprising a downwardly extending free lever end which is engaged and rotated at the picking site to tilt the front of the retractor downward and the back upward through a predetermined number of degrees to improve picking access.

* * * * *